Figure 1:
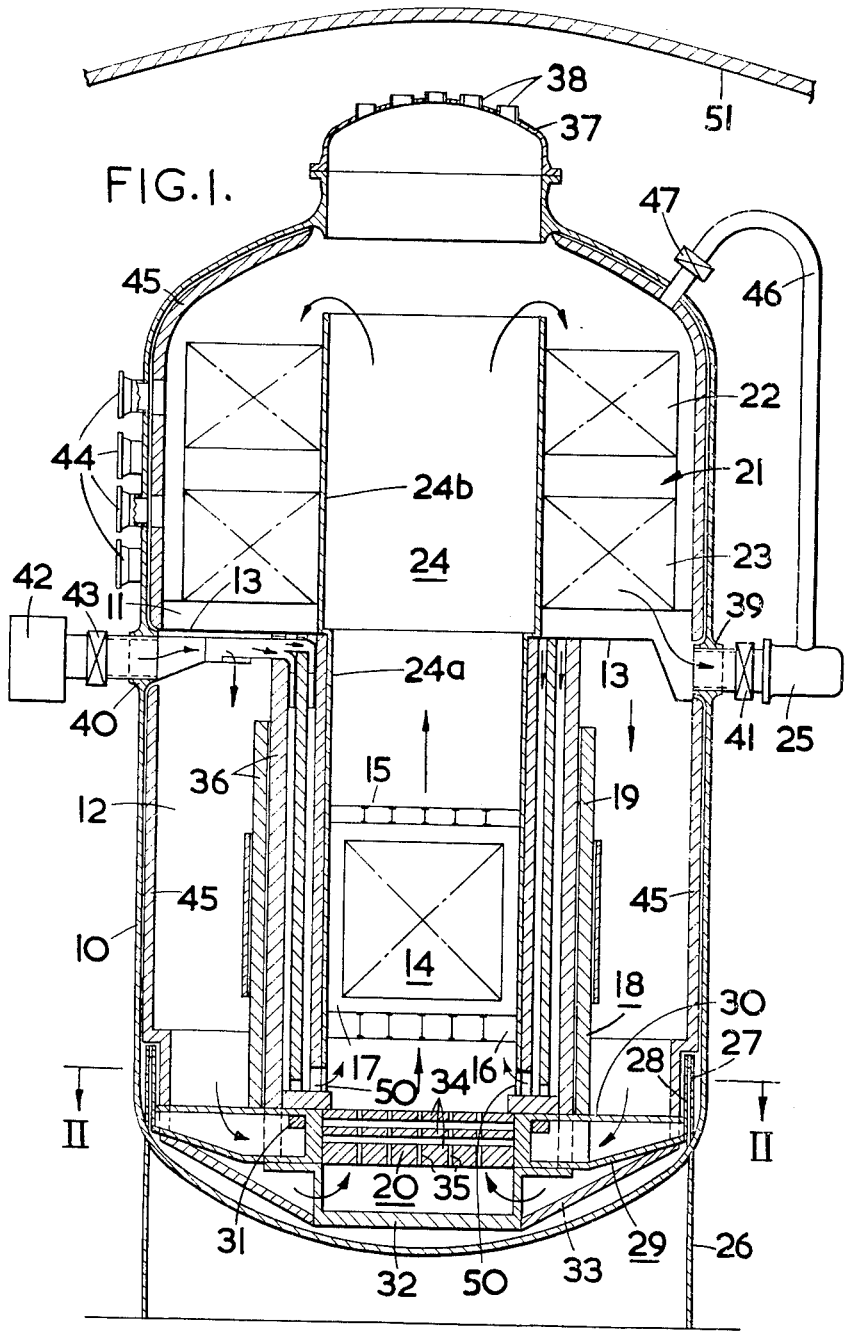

Aug. 31, 1965
R. P. WILLIAMS ETAL
3,203,867
ORGANIC LIQUID MODERATED AND COOLED NUCLEAR REACTORS
Filed June 26, 1961
2 Sheets-Sheet 2
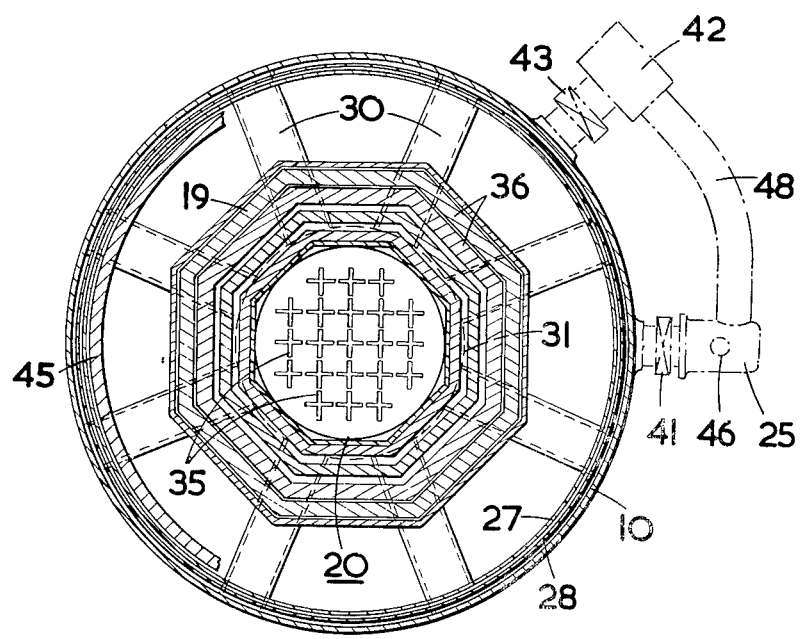
FIG. 2.
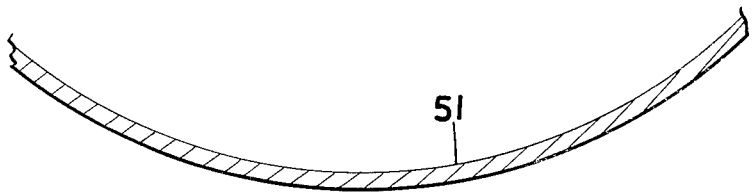

United States Patent Office 3,203,867
Patented Aug. 31, 1965

3,203,867
ORGANIC LIQUID MODERATED AND COOLED NUCLEAR REACTORS
Ronald Peter Williams and Peter Neil Munn, Culcheth, Warrington, England, and Thomas R. Duncan, Thurso, Caithness, Scotland, assignors to United Kingdom Atomic Energy Authority, London, England
Filed June 26, 1961, Ser. No. 119,401
4 Claims. (Cl. 176—61)

This invention relates to nuclear reactors of the kind known as organic liquid moderated and cooled reactors (see for example Paper No. 421 of the 1958 Geneva Conference on the Peaceful Uses of Atomic Energy, Volume 9, pages 468 to 498, by C. A. Trilling, on the American Organic Cooled and Moderated Reactor Experiment). The present invention provides such a reactor of improved constructional form.

The nuclear reactor according to the invention comprises an upright pressure vessel of generally cylindrical form having, in its lower regions, a reactor core structure and a shielding structure around and below the core structure, and in its upper regions, a heat exchanger disposed in annular form about a hollow column extending downwards to the top of the core structure, the pressure vessel being filled with an organic liquid functioning as moderator and coolant and immersing the core structure, the shielding structure and the heat exchanger, and a pump for causing flow of said liquid upwards through the core structure, along the column, through the heat exchanger, through and round the shielding structure and thence to the core structure, the arrangement being such that the shielding provided in the shielding structure in conjunction with the shielding inherent to the organic liquid reduces activity at the outer surface of said vessel to a level not requiring shielding external to the vessel.

One form of the invention will now be described by way of example with reference to the accompanying drawings wherein FIG. 1 is a sectional elevation of a ship-borne reactor and FIG. 2 is a plan view on the line II—II of FIG. 1.

There is shown within a mild steel containment 51 a silicon-killed steel cylindrical pressure vessel 10 of eighteen feet diameter and one and a half inches in thickness to accept a working pressure of 95 lbs. per square inch. The vessel 10 is divided into an upper region 11 and a lower region 12 by an annular baffle plate 13. In the lower region 12 there is provided a reactor core structure 14 supported between an upper grid 15 and a lower grid 16 and surrounded by a reflector 17. A shielding structure 18 of mild steel in spaced layers 36 disposed transverse to the path of neutrons emitted from the reactor core structure 14 exist as two principal parts, namely, an octagonal side part 19 around the core structure and a base part 20 below the core structure. In the upper region 11 there are eight heat exchangers 21 each having a superheater section 22 and an evaporator section 23. The heat exchangers 21 are disposed in an annular space about a hollow octagonal column 24 extending downwards to the core 14. The column 24 is composed of an upper boron-steel section 24b (protecting the heat exchangers 21) and a lower, mild-steel section 24a.

The vessel 10 is filled with "Santowax R," a terphenyl-based organic liquid moderator and coolant (see Paper No. 1779 by C. A. Trilling, 1958, Geneva Conference, Volume 29, pages 292 to 311). The liquid has not insignificant neutron absorbing properties and is circulated by four pumps 25, connected to outlet ports 39 in the vessel 10 and discharging along external ducts 48 (FIGURE 2), through coarse filters 42 and isolating valves 43 to re-enter the vessel through inlet ports 40. The liquid then passes downwards through the shielding structure 18, through apertures 50 in the column section 24a, upwards through the core structure 14, along the interior of the column 24, and downwards through the heat exchangers 21 as indicated by the arrows. The core inlet pressure is 95 lbs. per square inch and the core outlet temperature is 370° C. There is a by-pass connection 46 with valve 47 between the heat exchangers 21 and associated pumps 25. Steam/water connections 44 are provided to the heat exchangers 21.

The vessel 10 is carried on a cylindrical skirt 26 which has immediately above it, but inside the vessel, an outer cylindrical skirt 27 attached at its upper end to an inner cylindrical skirt 28. A forged steel grid structure 29 is attached to the lower end of the skirt 28, the structure having eight arms 30 extending between the skirt 28 and a central ring 31. Below the arms 30 and base shield 20 there is a pressure vessel shield composed of mild steel parts 32, 33. The inside of the vessel 10 is lined with a mild steel shield 45, which at its base, is provided by the parts 32, 33. The space between the shield 45 and shielding structure 18 provides a low impedance path for the circulating liquid.

The base part 20 of the shielding structure 18 is carried at the centre of the arms 30 and consists of a series of spaced plates 34 suitably perforated with twenty-one holes 35 to allow passage of coolant and to locate the lower ends of vertically-orientated cruciform-shaped control rods. The control rods are not shown in the figures for reason of clarity but follow conventional design, being of 4% boron steel clad in stainless steel. The control rods are moved by mechanism housed in standpipes 38 sealed to a flanged dome 37 in the vessel 10.

The core structure 14 follows conventional design and comprises 88 fuel elements end-located in the grids 15, 16. Each fuel element comprises a tubular, coolant conducting housing enclosing bundles of 100 fuel rods arranged on a square lattice. The housings are spaced from one another on a square pitch with the spaces between serving as a moderator space. The fuel elements are spring loaded in the grids 15, 16 so as to withstand shock loadings transmitted to the pressure vessel 10 through the hull of the ship in which the reactor is sited.

The reactor fuel is stoichiometric $UO_2$ pressed and sintered into pellet form with a density of 10.5 gm./cc. The pellets are ground to right circular cylinders of .3" diameter. The fuel sheaths are manufactured from vacuum-melted 18/8 Nb steel. The sheath wall is .01", the sheath length is 5 ft. and is hot-loaded at 600° C. with the fuel pellets. The tubular housings are manufactured from 18/8 stainless steel, .005" thick.

The shielding provided inside the pressure vessel 10 by the layers of moderator and mild steel about the core removes any need for external shielding. The moderator/coolant, which is a hydro-carbon, slows down fast neutrons coming out of the core 14 so that they may be captured by the mild steel and also, itself, absorbs slowed neutrons principally by reason of its hydrogen content. A high degree of protection against irradiation is thus afforded to the vessel material. The exterior surface of the vessel 10 can be approached for inspection unhindered by an external shield as activity at the surface is reduced to a tolerable level. The depth of moderator in the column 24 dispenses with the need for steel shielding above the core 14. The ferrous-based shielding structures 18, 20 and 45 provide economic-neutron absorbers.

The "Recommendations of the International Commission on Radiological Protection" (Pergamon Press) give maximum radiation doses that can be safely received by various categories of people and lay down the form of organisation to be established in areas affected by radiation, the invention being based on these recommendations. For example, under normal running conditions, access to the reactor containment 51 for 20 minutes per week at a dose of 1 rem. per week or 10 hours for a maximum single dose of 3 rem., and, after shut-down of the reactor for a period of:

(i) 15 minutes, 15 minutes after shut-down for a total dose of not more than 12 rem., or
(ii) 45 minutes, 5 hours after shut-down for a total dose of not more than 12 rem., or
(iii) 8 hours per day for a 3 week maintenance period commencing 2 weeks after shut-down for a total dose of not more than 2 rem.

Also access to controlled areas external the reactor containment (for example the reactor control room) for 8 hours per day continuously for a dose of not more than .5 rem. per year.

All the heat generated in the shield 18 during operation of the reactor is returned to the coolant as the coolant passes through and round the shield, the side part 19 close to the reactor core 14 accepting the major fraction of the coolant flow. In the parts remote from the core 14 a minor fraction flows principally to avoid stagnation. The construction provides few appendages to the pressure vessel, a feature of some significance in marine reactor systems which can be subjected to substantial shock and acceleration loads, the appendages providing points of weakness.

As coolant pressures in an organic liquid moderated/cooled reactor need not be very high (e.g. 100 lb. per square inch) the cost of accommodating the shield structure 18 within the pressure by providing a larger pressure vessel is not prohibitive.

The heat exchangers 21, being disposed within the pressure vessel 10 take advantage of the internal shielding provided by the moderator liquid, shield structure 18 and column section 24a.

Typical dimensions of the shielding provided are as follows:

Column 24:
    Upper section 24a—¾″ boron steel
    Lower section 24b—¾″ mild steel
Side shielding (moving outwards from the core):
    6″ Santowax (reflector 17)
    4″ steel
    4″ Santowax
    4″ steel
    4″ Santowax
    6″ steel
    ¼″ Santowax
    6″ steel
    ¼″ Santowax
    2″ steel
    30″ Santowax
    4″ steel (shield 45)
Bottom shielding (moving downwards from the core):
    6″ Santowax (reflector 17)
    ⅜″ steel (grid 16)
    9″ Santowax
    ⅜″ steel (grid 16)
    33″ Santowax
    3″ steel
    3″ Santowax
    3″ steel
    3″ Santowax
    6″ steel
    18″ Santowax
    3″ steel (shield 32)
Top shielding (moving upwards from the core):
    6″ Santowax (reflector 17)
    ⅜″ steel (grid 15)
    9″ Santowax
    ⅜″ steel (grid 15)
    250″ Santowax

We claim:

1. A nuclear reactor comprising an upright pressure vessel of a generally cylindrical form; an upright tubular barrier extending from the lower end of the pressure vessel to the upper end of the pressure vessel and defining with the side wall of the pressure vessel an annular space; a core structure disposed in the tubular barrier in the lower region of the pressure vessel; an annular baffle in the annular space between the pressure vessel and the tubular barrier dividing the annular space into an upper region and a lower region; a heat exchanger disposed in the upper region of the annular space; space layers of ferrous-based material enclosing the sides and bottom of the core structure, the layers being disposed transverse to paths of neutrons from the reactor core and defining with each other and the wall of the pressure vessel a plurality of flow paths within the lower region of the annular space; means defining flow path apertures in the layers of ferrous-based material for fluid communication with the flow paths; a mass of liquid functioning as a moderator and core coolant filling the pressure vessel; and pump means including means for introducing the liquid into the upper portion of said lower region and causing the liquid to flow downwardly to the lower region of the annular space and the flow paths in the spaces between the layers of ferrous-based material, through the apertures to the core structure, upwards through the core structure and along the interior of the tubular barrier to the upper part of the pressure vessel and to return in counterflow through the upper region of the annular space and said heat exchanger.

2. A nuclear reactor according to claim 1 wherein the pump means further comprise means for withdrawing the liquid from the upper region of the annular space to the exterior of the pressure vessel and duct means connecting the withdrawing means to the introducing means for recycling of the liquid.

3. A nuclear reactor according to claim 2 wherein the withdrawing means is located at the lower part of the upper region of the annular space, and further comprising bypass means for directing part of the liquid directly from the withdrawing means for reintroduction into the pressure vessel at the upper part of the upper region of the annular space.

4. A nuclear reactor according to claim 1 and further comprising a cylindrical skirt supporting the pressure vessel at the bottom of the pressure vessel and a grid structure within the pressure vessel attached to the skirt, the grid structure supporting the core structure, tubular barrier, and space layers of ferrous-based material.

References Cited by the Examiner

UNITED STATES PATENTS

| | | | |
|---|---|---|---|
| 2,810,689 | 10/57 | Wigner et al. | 176—62 |
| 2,873,243 | 2/59 | Wigner et al. | 176—64 |
| 2,902,425 | 9/59 | Kosmin et al. | 176—65 |
| 3,053,746 | 9/62 | Challender et al. | 176—27 |
| 3,060,111 | 10/62 | Sherman et al. | 176—18 |

FOREIGN PATENTS

| | | |
|---|---|---|
| 563,693 | 1/58 | Belgium. |
| 754,183 | 8/56 | Great Britain. |

OTHER REFERENCES

German printed application 1,021,515, December 27, 1957.

CARL D. QUARFORTH, *Primary Examiner.*

REUBEN EPSTEIN, *Examiner.*